(12) United States Patent
Suzuki

(10) Patent No.: US 10,186,415 B2
(45) Date of Patent: Jan. 22, 2019

(54) DISCHARGE LAMP THAT INCLUDES A LUMINOUS TUBE AND A PAIR OF ELECTRODES AND A MANUFACTURING METHOD FOR DISCHARGE LAMP AND PROJECTOR

(71) Applicant: SEIKO EPSON CORPORATION, Tokyo (JP)

(72) Inventor: Junichi Suzuki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 307 days.

(21) Appl. No.: 15/205,847

(22) Filed: Jul. 8, 2016

(65) Prior Publication Data

US 2017/0025266 A1 Jan. 26, 2017

(30) Foreign Application Priority Data

Jul. 22, 2015 (JP) ................................. 2015-144715

(51) Int. Cl.
| | | |
|---|---|---|
| *H01J 61/073* | (2006.01) | |
| *G03B 21/00* | (2006.01) | |
| *G03B 21/20* | (2006.01) | |
| *H01J 9/18* | (2006.01) | |

(52) U.S. Cl.
CPC ...... *H01J 61/0732* (2013.01); *G03B 21/2026* (2013.01); *H01J 9/18* (2013.01); *H01J 61/0735* (2013.01); *G03B 21/2066* (2013.01)

(58) Field of Classification Search
CPC .............. H01J 61/0732; H01J 61/0735; G03B 21/2026
See application file for complete search history.

(56) References Cited

U.S. PATENT DOCUMENTS

| | | |
|---|---|---|
| 5,818,169 A | 10/1998 | Morimoto et al. |
| 6,307,321 B1 | 10/2001 | Honda et al. |
| 7,211,956 B2 | 5/2007 | Tukamoto et al. |
| 7,967,449 B2 | 6/2011 | Onodera |
| 8,704,436 B1 | 4/2014 | Ogawa et al. |
| 2001/0038267 A1 | 11/2001 | Ono et al. |
| 2004/0245930 A1 | 12/2004 | Tukamoto et al. |
| 2008/0203918 A1 | 8/2008 | Onodera |
| 2014/0117836 A1 | 5/2014 | Ogawa et al. |

FOREIGN PATENT DOCUMENTS

| | | |
|---|---|---|
| CN | 101924009 A | 12/2010 |
| JP | H08-45471 A | 2/1996 |
| JP | H08-273594 A | 10/1996 |

(Continued)

*Primary Examiner* — Joseph L Williams
(74) *Attorney, Agent, or Firm* — Oliff PLC

(57) ABSTRACT

A discharge lamp includes a luminous tube and a pair of electrodes. At least one of the pair of electrodes includes a core material, a coil section in which a metal wire is wound on the core material in three or more layers, a distal end portion made of a conductor and provided, with respect to the coil section, at an end portion of the core material on a side where the other electrode is disposed, and a rear end portion made of a conductor and provided on the opposite side of the distal end portion with respect to the coil section. The rear end portion includes a first diameter section having a first diameter and a second diameter section having a second diameter smaller than the first diameter and present in a position farther from the coil section than the first diameter section.

16 Claims, 7 Drawing Sheets

(56) References Cited

FOREIGN PATENT DOCUMENTS

| | | | |
|---|---|---|---|
| JP | H09-17387 | A | 1/1997 |
| JP | 2000-048769 | A | 2/2000 |
| JP | 3158972 | B2 | 4/2001 |
| JP | 2004-362861 | A | 12/2004 |
| JP | 2008-210739 | A | 9/2008 |
| JP | 4289409 | B2 | 7/2009 |
| JP | 4297227 | B2 | 7/2009 |
| JP | 4400095 | B2 | 1/2010 |
| JP | 2010-287359 | A | 12/2010 |
| JP | 2014-093154 | A | 5/2014 |

DISCHARGE LAMP THAT INCLUDES A LUMINOUS TUBE AND A PAIR OF ELECTRODES AND A MANUFACTURING METHOD FOR DISCHARGE LAMP AND PROJECTOR

BACKGROUND

1. Technical Field

The present invention relates to a discharge lamp, a manufacturing method for the discharge lamp, a light source device, and a projector.

2. Related Art

As a light source of a projector, a discharge lamp such as an ultra-high pressure mercury lamp is known. In the discharge lamp of this type, a pair of electrodes made of metal such as tungsten is disposed to be opposed to each other in the internal space of a luminous tube made of quartz glass and is encapsulated together with mercury and a halogen gas. As a manufacturing method for the electrodes, there is known a method of winding a lead wire of metal on a core material in a coil shape and thereafter melting a part of the lead wire and forming a distal end portion functioning as a start point of electric discharge.

For example, Japanese Patent No. 4400095 (Patent Literature 1) discloses a short-arc type ultra-high pressure mercury lamp including electrodes including projecting sections, large diameter sections, coil sections, and shaft sections. In the ultra-high pressure mercury lamp, coils have a double wound structure in which the coils are wound on the shaft sections from the distal ends toward the bases of the electrodes and thereafter folded back in the bases and wound from the bases toward the distal ends. The end portions of the coils located on the outer surfaces are melted and integrated with the large diameter sections.

Incidentally, examples of a factor of reducing the life of the discharge lamp include devitrification of the luminous tube and an increase in an inter-electrode distance due to wear of the electrodes. It is known that a factor of the devitrification is electric discharge that occurs between the electrodes and the luminous tube, in particular, electric discharge that occurs between the rear end portions of the electrodes, which have a short distance to a luminous tube wall, and the inner wall of the luminous tube. As a method of suppressing the increase in the inter-electrode distance, a driving method for the discharge lamp is often adopted. According to the driving method for the discharge lamp, a waveform of a driving current supplied to the discharge lamp is contrived to facilitate formation of protrusions at electrode distal ends to thereby maintain an appropriate inter-electrode distance.

However, even if the inter-electrode distance is maintained by the driving method for the discharge lamp, unless the electrodes have a size (a capacity) enough for withstanding the driving method, the electrodes are worn by heat, for example, when the driving current supplied to the discharge lamp is large. Therefore, the electrode capacity needs to be set large to a certain degree. For example, as in the electrode forming method of Patent Literature 1, when the coils are doubly wound on the shaft sections, the coils are wound on the shaft sections long in order to increase the weight of the electrodes. In such a method, the entire shape of the electrodes is long in an extending direction of the shaft section. An electrode substance supplied to form protrusion sections in the large diameter sections at the electrode distal ends is present in a position far from the large diameter sections at the electrode distal ends where arc discharge occurs. Therefore, it is difficult to maintain the protrusion sections. The inter-electrode distance increases. Even if the coil end portions are melted, since the coils having a diameter enough for sufficiently securing the electrode capacity through the double winding are used, it is difficult to secure a long distance between the electrode rear end portions and the inner wall of the luminous tube. It is difficult to suppress electric discharge between the electrodes and the luminous tube.

SUMMARY

An advantage of some aspects of the invention is to provide a discharge lamp that can achieve an increase in life by suppressing both of the increase in the inter-electrode distance and the electric discharge between the electrodes and the luminous tube. Another advantage of some aspects of the invention is to provide a method of reasonably manufacturing the discharge lamp. Still another advantage of some aspects of the invention is to provide a light source device including the discharge lamp. Yet another advantage of some aspects of the invention is to provide a projector including the light source device.

A discharge lamp according to an aspect of the invention includes: a luminous tube; and a pair of electrodes provided on the inside of the luminous tube. At least one of the pair of electrodes includes a core material, a coil section in which a metal wire is wound on the core material in three or more layers, a distal end portion made of a conductor and provided, with respect to the coil section, at an end portion of the core material on a side where the other electrode is disposed, and a rear end portion made of a conductor and provided on the opposite side of the distal end portion with respect to the coil section. The rear end portion includes a first diameter section having a first diameter and a second diameter section having a second diameter smaller than the first diameter and present in a position farther from the coil section than the first diameter section.

In the discharge lamp according to the aspect, the at least one electrode includes the coil section in which the metal wire is wound on the core material in three or more layers. Therefore, when it is attempted to realize an electrode having a predetermined size and a predetermined capacity, the diameter of the lead wire in the aspect is smaller than the diameter of the metal wire of the electrode in the past including the double winding coil section. Therefore, in the electrode in the aspect, it is possible to further increase the density of the metal wire of the coil section than in the electrode in the past. Consequently, it is possible to further increase an amount of the electrode substance supplied to form the protrusion section at the electrode distal end to be larger than an amount of the electrode substance in the past. It is possible to suppress the increase in the inter-electrode distance.

In addition, the rear end portion includes the second diameter section having a diameter smaller than the diameter of the first diameter section and provided in the position farther from the coil section than the first diameter section, that is, on the rear end side of the core material. Therefore, it is possible to secure a long distance between the electrode rear end portion and the inner wall of the luminous tube. Consequently, it is possible to suppress occurrence of electric discharge between the electrode and the luminous tube. In this way, according to the aspect, it is possible to suppress both of the increase in the inter-electrode distance and the electric discharge between the electrode and the luminous tube. It is possible to realize the discharge lamp having long life.

In the discharge lamp according to the aspect, a ratio of the diameter of the lead wire to the diameter of the core material may be larger than 0.2 and smaller than 0.5.

With this configuration, it is possible to suppress, while securing a sufficient capacity of the electrode, a situation in which a part of light from arc discharge is blocked by the distal end portion of the electrode when the outer diameter of the electrode is too large and a light amount of the light emitted from the discharge lamp decreases and secure the luminance of the discharge lamp.

In the discharge lamp in the aspect, at least a part of the rear end portion may have a configuration in which the metal wire is wound on the core material.

With this configuration, as explained above, the rear end portion is configured by the metal wire having a smaller diameter than in the past. Consequently, a level difference of the metal wire formed from the center side of the electrode toward the rear end side decreases. It is possible to suppress the rear end portion from functioning as a start point of electric discharge between the electrode and the luminous tube.

In the discharge lamp in the aspect, at least the part of the rear end portion may include a step section in which the diameter of the rear end portion decreases stepwise from a side close to the coil section toward a side far from the coil section.

With this configuration, the coil section may remain in at least a part of the rear end portion. Therefore, it is possible to reduce a load required for melting treatment of the metal wire while maintaining the effect of suppressing the electric discharge between the electrode and the luminous tube.

In the discharge lamp according to the aspect, the coil section may include a first coil section in which the metal wire is wound on the core material, a second coil section in which the metal wire is wound on the first coil section, and a third coil section in which the metal wire is wound on the second coil section. The step section may be formed by setting the length of the second coil section in an extending direction of the core material to be equal to or smaller than the length of the first coil section in the extending direction of the core material and setting the length of the third coil section in the extending direction of the core material to be smaller than the length of the second coil section.

With this configuration, it is possible to realize an electrode having a shape in which a diameter decreases toward the rear end side and it is possible to form an electrode with an electrode capacity deviated to the electrode distal end side where arc discharge occurs. Therefore, it is possible to secure a long distance between the electrode rear end section and the luminous tube and it is possible to reduce electric discharge between the electrode and the luminous tube. At the same time, it is possible to form an electrode that can withstand a heat load to the electrode due to various driving methods for maintaining the inter-electrode distance of the discharge lamp and suppress wear of the electrode.

In the discharge lamp according to the aspect, at least apart of the surface of the rear end portion may be melted and integrated.

With this configuration, since at least a part of the surface of the rear end portion is melted and integrated, it is possible to further reduce the level difference due to the metal wire at the rear end portion. Consequently, it is possible to suppress electric discharge between the electrode and the luminous tube.

In the discharge lamp according to the aspect, at least the part of the rear end portion may include an inclining section inclining in a direction in which the diameter of the rear end port ion decreases from a side close to the coil section toward a side far from the coil section.

With this configuration, since the shape of the rear end portion becomes gentler, it is possible to suppress electric discharge between the electrode and the luminous tube.

A discharge lamp according to another aspect of the invention includes: a luminous tube; and a pair of electrodes provided on the inside of the luminous tube. At least one of the pair of electrodes includes a core material, a coil section in which a metal wire is wound on the core material in three or more layers, and a distal end portion made of a conductor and provided, with respect to the coil section, at an end portion of the core material on a side where the other electrode is disposed. The coil section includes a first coil section in which the metal wire is wound on the core material, a second coil section in which the metal wire is wound on the first coil section, and a third coil section in which the metal wire is wound on the second coil section. The length of the second coil section in an extending direction of the core material is equal to or smaller than the length of the first coil section in the extending direction of the core material. The length of the third coil section in the extending direction of the core material is smaller than the length of the second coil section in the extending direction of the core material. An end portion of the coil section on the opposite side of the distal end portion includes a first diameter section having a first diameter and a second diameter section having a second diameter smaller than the first diameter and present in a position farther from the coil section than the first diameter section.

The at least one electrode of the discharge lamp in the aspect includes the coil section at least including the first coil section, the second coil section, and the third coil section. In the coil section, the metal wire is wound on the core material in three or more layers. Therefore, when it is attempted to realize an electrode having a predetermined size, the diameter of the metal wire of the electrode in the aspect is smaller than the diameter of the metal wire of the electrode in the past including the double winding coil section. Therefore, in the electrode in the aspect, it is possible to further increase the density of the metal wire of the coil section than in the electrode in the past. Consequently, it is possible to further increase an amount of the electrode substance supplied to form the protrusion section at the electrode distal end to be larger than an amount of the electrode substance in the past. It is possible to suppress the increase in the inter-electrode distance.

In addition, the length of the second coil section in the extending direction of the core material is equal to or smaller than the length of the first coil section in the extending direction of the core material. The length in the third coil section in the extending direction of the core material is smaller than the length of the second coil section in the extending direction of the core material. The rear end portion of the coil section includes the first diameter section and the second diameter section having a diameter smaller than the diameter of the first diameter section and provided in the position farther from the coil section than the first diameter section. Consequently, it is possible to realize an electrode having a shape in which a diameter decreases toward the rear end side and it is possible to form an electrode in which an electrode capacity is deviated to the electrode distal end side where arc discharge occurs. Therefore, it is possible to secure a long distance between the electrode rear end portion and the luminous tube and it is possible to reduce electric discharge between the electrode and the luminous tube. At the same time, it is possible to form an electrode that can withstand a heat load to the electrode due to various driving methods for maintaining the inter-electrode distance of the discharge lamp and suppress wear of the electrode. In this way, according to the aspect, it is possible to realize the discharge lamp having long life by reducing electric discharge between the electrode and the luminous tube and suppressing occurrence of devitrification in the discharge lamp while reducing wear of the electrode and suppressing an increase in the inter-electrode distance.

A manufacturing method according to still another aspect of the invention is a manufacturing method for a discharge lamp including a luminous tube and a pair of electrodes provided on the inside of the luminous tube. The manufacturing method includes: manufacturing the pair of electrodes; and encapsulating the pair of electrodes on the inside of the luminous tube. The manufacturing the pair of electrodes includes: winding a metal wire on a core material in three or more layers to thereby form a coil section; and melting and integrating the distal end side of the core material wound with the metal wire. In the forming the coil section, the coil section includes a first coil section in which the metal wire is wound on the core material, a second coil section in which the metal wire is wound on the first coil section, and a third coil section in which the metal wire is wound on the second coil section. The length of the second coil section in an extending direction of the core material is equal to or smaller than the length of the first coil section in the extending direction of the core material. The length of the third coil section in the extending direction of the core material is smaller than the length of the second coil section in the extending direction of the core material. The metal wire is wound on the core material such that the first coil section and the second coil section are exposed on the rear end side of the core material.

In the manufacturing method for the discharge lamp in the aspect, the length of the second coil section is equal to or smaller than the length of the first coil section, the length of the third coil section is smaller than the length of the second coil section, and a lead wire is wound on the core material such that the first coil section and the second coil section are exposed on the rear end side of the core material. Consequently, it is possible to suppress an increase in the inter-electrode distance and electric discharge between the electrode and the luminous tube and reasonably manufacture a discharge lamp having long life.

A light source device according to yet another aspect of the invention includes: the discharge lamp according to the aspect; and a discharge lamp lighting device configured to supply a driving current to the discharge lamp and light the discharge lamp.

With this configuration, it is possible to realize the light source device excellent in quality including the discharge lamp having long life.

A projector according to still yet another aspect of the invention includes: the light source device according to the aspect; a light modulating device configured to modulate, according to image information, light emitted from the light source device; and a projection optical system configured to project the light modulated by the light modulating device.

With this configuration, it is possible to realize the projector excellent in quality including the light source device including the discharge lamp having long life.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
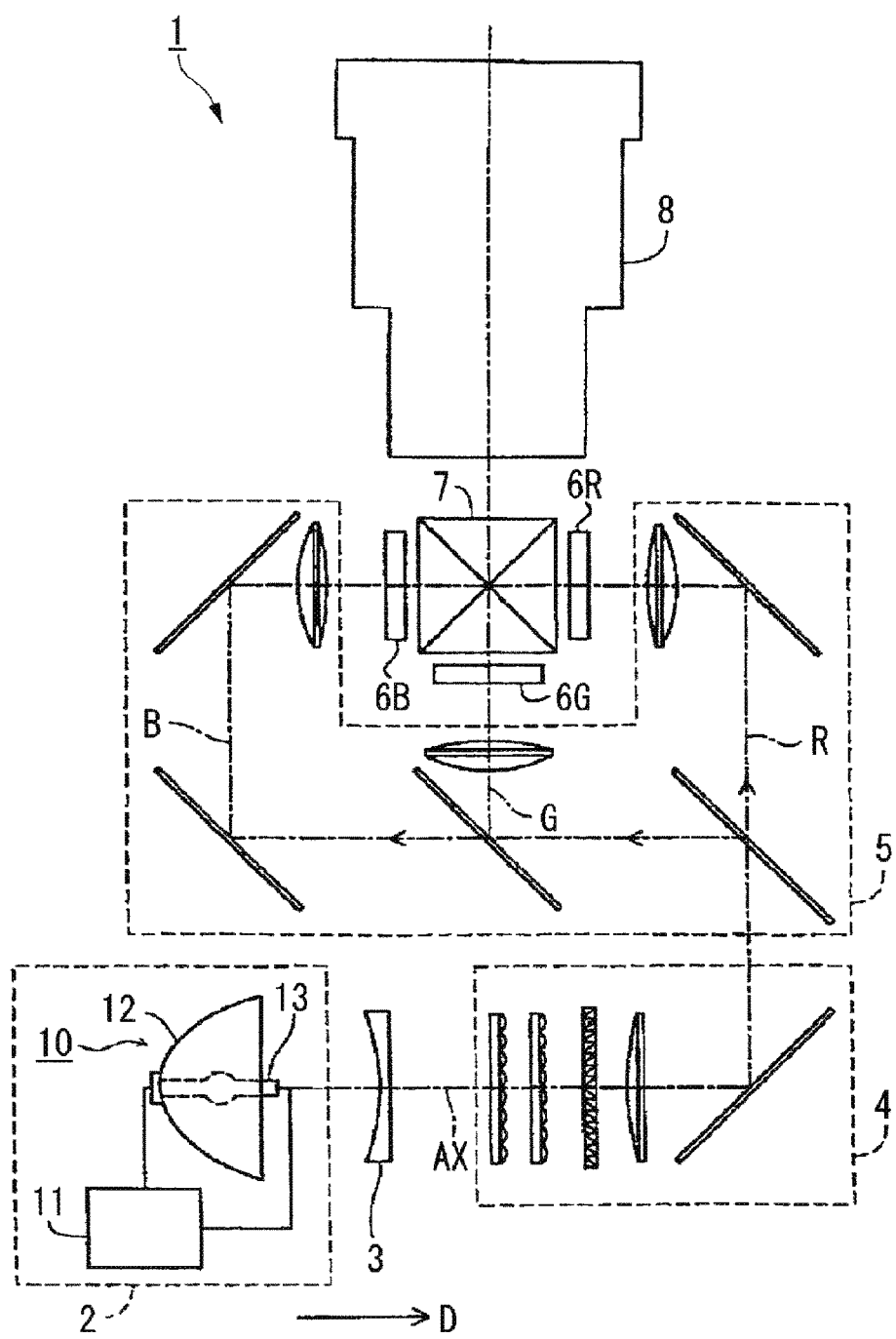
FIG. 1 is a schematic configuration diagram of a projector in a first embodiment.

A first embodiment of the invention is examined below with reference to FIGS. 1 to 6B.

In this embodiment, a liquid crystal projector of a so-called three-plate type is illustrated in which three sets of transmission-type liquid crystal light valves are used as light modulating elements.

In the drawings referred to below, in order to clearly show components, some components are shown indifferent scales of dimensions.

As shown in FIG. 1, a projector 1 in this embodiment includes a light source device 2, a collimating lens 3, an illumination optical system 4, a color separation optical system 5, a liquid crystal light valve 6R, a liquid crystal light valve 6G, and a liquid crystal light valve 6B, a cross dichroic prism 7, and a projection optical system 8.

The liquid crystal light valve 6R, the liquid crystal light valve 6G, and the liquid crystal light valve 6B in this embodiment correspond to the light modulating device in the appended claims.

Light emitted from the light source device 2 passes through the collimating lens 3 and is made incident on the illumination optical system 4. The collimating lens 3 collimates the light emitted from the light source device 2.

The illumination optical system 4 adjusts the illuminance of the light emitted from the light source device 2 to be equalized on the liquid crystal light valve 6R, the liquid crystal light valve 6G, and the liquid crystal light valve 6B. The illumination optical system 4 aligns polarizing directions of the light emitted from the light source device 2 in one direction. This is for the purpose of effectively using the light emitted from the light source device 2 in the liquid crystal light valve 6R, the liquid crystal light valve 6G, and the liquid crystal light valve 6B.

The light emitted from the illumination optical system 4 is made incident on the color separation optical system 5. The color separation optical system 5 separates the incident light into three color lights of red light (R), green light (G), and blue light (B). The three color lights are respectively modulated according to video signals by the liquid crystal light valve 6R, the liquid crystal light valve 6G, and the liquid crystal light valve 6B associated with the color lights.

The liquid crystal light valve 6R, the liquid crystal light valve 6G, and the liquid crystal light valve 6B respectively include liquid crystal panels and polarizing plates. The polarizing plates are disposed on light incident sides and light emission sides of the respective liquid crystal panels.

The three color lights respectively modulated by the liquid crystal light valve 6R, the liquid crystal light valve 6G, and the liquid crystal light valve 6B are combined by the cross dichroic prism 7. Combined light is made incident on the projection optical system 8. The projection optical system 8 projects the incident light on a screen (not shown in the figure). Consequently, a video is displayed on the screen. In the collimating lens 3, the illumination optical system 4, the color separation optical system 5, the cross-dichroic prism 7, and the projection optical system 8, well-known configurations can be respectively adopted.

Figure 2:
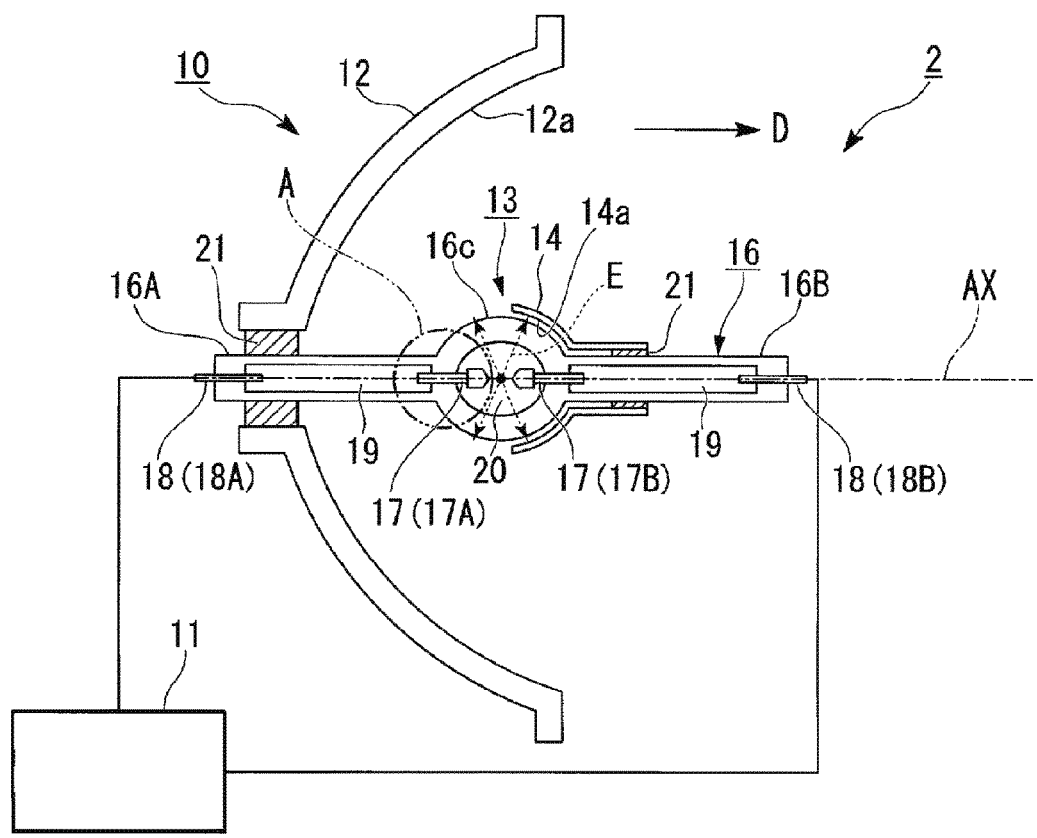
FIG. 2 is a schematic configuration diagram of a light source device in the first embodiment.

FIG. 2 is a sectional view showing the configuration of the light source device 2.

The light source device 2 includes a light source unit 10 and a discharge lamp lighting device 11. The light source unit 10 includes a main reflection mirror 12, a discharge lamp 13, and a sub-reflection mirror 14.

The discharge lamp lighting device 11 supplies a driving current (driving power) to the discharge lamp 13 and lights the discharge lamp 13.

The main reflection mirror 12 reflects light emitted from the discharge lamp 13 toward a radiating direction D. The radiating direction D is parallel to an optical axis AX of the discharge lamp 13 and is a direction in which the main reflection mirror 12 is opened. The optical axis AX of the discharge lamp 13 is substantially parallel to a direction in which an end portion of a luminous tube explained below extends.

The discharge lamp 13 includes a luminous tube 16, a pair of electrodes 17, a pair of terminals 18, and a conductive member 19. The luminous tube 16 has a bar-like shape generally extending along the radiating direction D. In the following explanation, of both end portions of the luminous tube 16, the end portion on a side fixed to the main reflection mirror 12 is referred to as first end portion 16A and the end portion on the opposite side of the first end portion 16A is referred to as second end portion 16B. The luminous tube 16 is configured by a light-transmitting material such as quartz glass. A swelling section 16C swelling in a spherical shape is provided between the first end portion 16A and the second end portion 16B of the luminous tube 16. The inside of the swelling section 16C is a space in which electric discharge is caused between the pair of electrodes 17, a so-called discharge space 20. In the discharge space 20, gas, which is a discharge medium including a rare gas and a metal halogen compound, is encapsulated.

The pair of electrodes 17 is provided on the inside of the luminous tube 16. In the following explanation, of the pair of electrodes 17, the electrode located on the side of the first end portion 16A of the luminous tube 16 is referred to as first electrode 17A and the electrode located on the side of the second end portion 16B of the luminous tube 16 is referred to as second electrode 17B. The rear ends of the first electrode 17A and the second electrode 17B are embedded in the first end portion 16A and the second end portion 16B of the luminous tube 16. On the other hand, the distal ends of the first electrode 17A and the second electrode 17B are located in the discharge space 20. The shape of the first electrode 17A and the second electrode 17B are a bar shape extending along the optical axis AX. The diameter on the distal end side of the first electrode 17A and the second electrode 17B is larger than the diameter on the rear end sides. In the discharge space 20, the distal end of the first electrode 17A and the distal end of the second electrode 17B are spaced apart a predetermined distance and opposed to each other. The material of the first electrode 17A and the second electrode 17B is metal such as tungsten.

A first terminal 18A is provided at the first end portion 16A of the luminous tube 16. The first terminal 18A and the first electrode 17A are electrically connected via a conductive member 19 that pierces through the inside of the first terminal 18A. Similarly, a second terminal 18B is provided at the second end portion 16B of the luminous tube 16. The second terminal 18B and the second electrode 17B are electrically connected via the conductive member 19 that pierces through the inside of the second terminal 18B. The material of the first terminal 18A and the second terminal 18B is metal such as tungsten. As the conductive member 19, for example, molybdenum foil is used.

The first terminal 18A and the second terminal 18B are connected to the discharge lamp lighting device 11. The discharge lamp lighting device 11 supplies a driving current for driving the discharge lamp 13 to the first terminal 18A and the second terminal 18B. Consequently, arc discharge occurs between the first electrode 17A and the second electrode 17B. Light generated by the arc discharge is radiated from a discharge position toward all the directions as indicated by broken line arrows E.

The main reflection mirror 12 is fixed to the first end portion 16A of the luminous tube 16 by a fixing member 21. The main reflection mirror 12 reflects light generated by the swelling section 16C toward the radiating direction D. The shape of a reflection surface 12a (a surface on a side where the discharge lamp 13 is disposed) of the main reflect ion mirror 12 is not particularly limited as long as the reflection surface 12a can reflect the light toward the radiating direction D. The shape of the reflection surface 12a of the main reflection mirror 12 may be, for example, a spheroidal shape or may be a rotated parabolic shape. For example, when the reflection surface 12a of the main reflection mirror 12 is formed in the rotated parabolic shape, the main reflection mirror 12 can convert emitted light from the light source unit 10 into light substantially parallel to the optical axis AX. Consequently, it is possible to omit the collimating lens 3.

The sub-reflection mirror 14 is fixed to the second end portion 16B of the luminous tube 16 by the fixing member 21. The shape of a reflection surface 14a of the sub-reflection mirror 14 is a semispherical shape that covers substantially a half of the swelling section 16C. The sub-reflection mirror 14 reflects a part of the light generated by the swelling section 16C toward the main reflection mirror 12. Consequently, it is possible to improve efficiency of use of the light radiated from the discharge space 20.

The material of the fixing member 21 is not particularly limited as long as the material is a heat resistant material that can withstand heat generation from the discharge lamp 13. The material of the fixing member 21 is, for example, an inorganic adhesive. A method of fixing the main reflection mirror 12 and the discharge lamp 13 or the sub-reflection mirror 14 and the discharge lamp 13 is not always limited to the method explained above. Any method can be adopted as the method. For example, the discharge lamp 13 and the main reflection mirror 12 may be fixed to a housing (not shown in the figure) of the projector 1 independently from each other. The same applies to the sub-reflection mirror 14.

Figure 3:
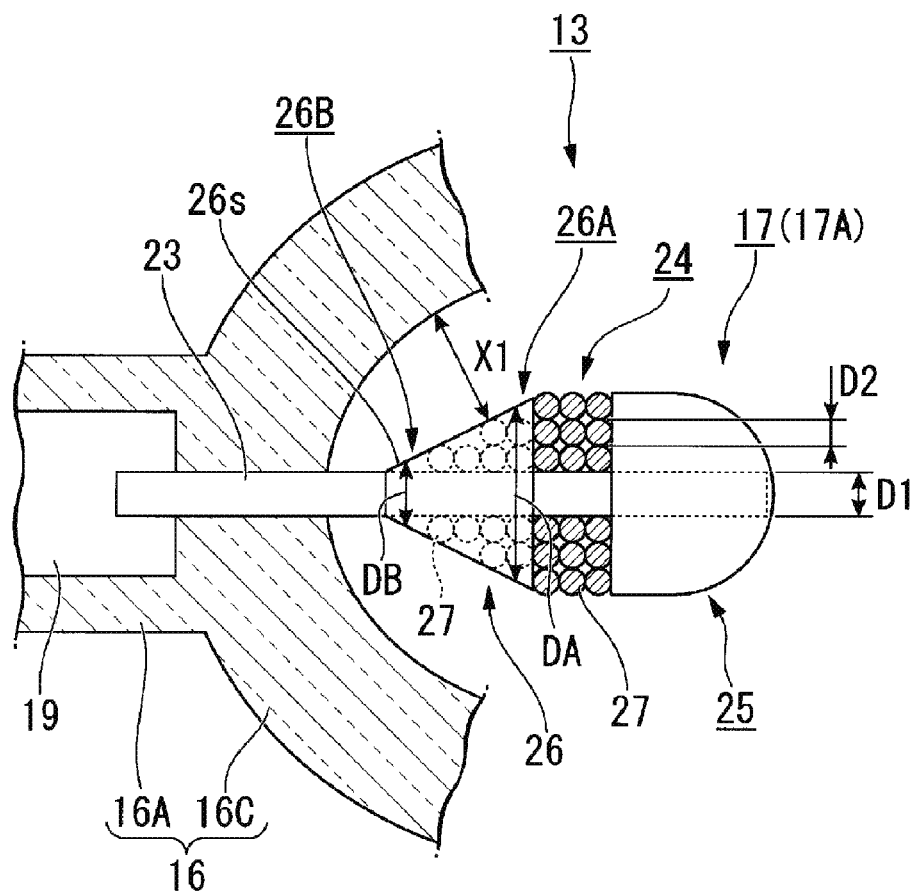
FIG. 3 is a partial sectional view of an electrode used in a discharge lamp.

FIG. 3 is a sectional view of a part of the first electrode 17A. In this embodiment, the first electrode 17A and the second electrode 17B are symmetrically disposed. The structure of the first electrode 17A and the structure of the second electrode 17B are common. Therefore, in the following explanation, the configuration of the electrode 17 is represented by the first electrode 17A and explained.

The electrode 17 includes a core material 23, a coil section 24, a distal end portion 25, and a rear end portion 26. The core material 23 is a bar material of metal such as tungsten. The coil section 24 has a configuration in which a lead wire (a metal wire) 27 made of tungsten is wound on the core material 23 in three layers. The coil section 24 functions as a start point of electric discharge when the discharge lamp 13 is lit. The coil section 24 discharges heat generated by the pair of electrodes 17 after the lighting of the discharge lamp 13. A ratio (D2/D1) of a diameter D2 of the lead wire 27 to a diameter D1 of the core material 23 is desirably larger than 0.2 and smaller than 0.5 (0.2<D2/D1<0.5). As an example of specific dimensions, the diameter D1 of the core material 23 is approximately 0.5 mm and the diameter D2 of the lead wire 27 is approximately 0.2 mm.

The distal end portion 25 is provided, with respect to the coil section 24, at the distal end of the core material 23 on a side where the second electrode 17B is disposed. The distal end portion 25 is configured by a conductor such as tungsten. The distal end of the distal end portion 25 is a portion where a protrusion functioning as a start point of arc discharge during the lighting is formed. The distal end of the distal end portion 25 is formed in a rounded shape. A manufacturing process for the electrode 17 is explained below. The distal end portion 25 is obtained by melting the lead wire 27 wound on the core material 23 and integrating the lead wire 27 to be a conductor. Therefore, when the entire lead wire 27 is completely melted in the manufacturing process, the original form of the lead wire 27 does not remain at the distal end portion 25. Alternatively, when the entire lead wire 27 is not completely melted in the manufacturing process, the original form of the lead wire 27 partially remains. The distal end portion 25 may have any one of these configurations.

The rear end portion 26 is provided on the opposite side of the distal end portion 25 with respect to the coil section 24. The rear end portion 26 is configured by a conductor such as tungsten. The rear end portion 26 includes at least a first diameter section 26A having a first diameter DA and a second diameter section 26B having a second diameter DB. The second diameter DB is smaller than the first diameter DA. The second diameter section 26B is present in a position farther from the coil section 24 than the first diameter section 26A. Like the distal end portion 25, the rear end portion 26 shown in FIG. 3 is obtained by melting the lead wire 27 of tungsten wound on the core material 23 and integrating the lead wire 27 to be a conductor.

In the case of this embodiment, in the manufacturing process, the rear end portion 26 is melted to a degree for melting the surface of the lead wire wound on the core material 23 and not melting a portion of the lead wire 27 close to the core material 23. Consequently, in the rear end portion 26, windings of the lead wire 27 adjacent to one another are melted and integrated. Since the surface of the lead wire 27 is melted, the surface of the rear end portion 26 is formed as an inclining surface (an inclining section) 26s inclining in a direction in which the diameter of the rear end portion 26 decreases from a side close to the coil section 24 to a side far from the coil section 24. On the inside of the rear end portion 26 near the core material 23, the lead wire 27 remains as indicated by broken lines.

Two examples of the manufacturing process for the discharge lamp 13 having the configuration explained above are explained below.

FIGS. 4A to 4E are diagrams showing a first manufacturing process for the electrode 17.

The manufacturing process for the discharge lamp 13 in this embodiment includes a step of manufacturing the pair of electrodes 17 and a step of encapsulating the pair of electrodes 17 on the inside of the luminous tube 16. The step of manufacturing the pair of electrodes 17 includes a step of winding the lead wire 27 on the core material 23 in three layers to thereby form the coil section 24, a step of melting and integrating the distal end side of the core material 23 wound with the lead wire 27 to form the distal end portion 25, and a step of melting and integrating the rear end side of the core material 23 wound with the lead wire 27 to form the rear end portion 26. A publicly-known method can be used concerning the step of encapsulating the pair of electrodes 17 on the inside of the luminous tube 16. Therefore, explanation of the step is omitted.

In the following explanation, in the coil section 24, the coil in the first layer wound on the core material 23 is referred to as first coil section 24A, the coil in the second layer wound on the first coil section 24A is referred to as second coil section 24B, and the coil in the third layer wound on the second coil section 24B is referred to as third coil section 24C.

Figure 4A:
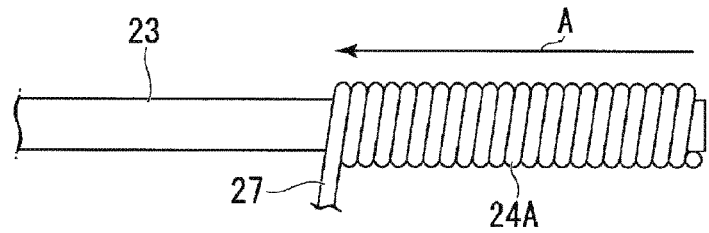
FIGS. 4A to 4E are diagrams showing a manufacturing process for the electrode.

First, as shown in FIG. 4A, the lead wire 27 made of tungsten is wound on the core material 23 made of tungsten. In FIGS. 4A to 4E, the right side of the core material 23 is set as the distal end side and the left side of the core material 23 is set as the rear end side. The winding of the lead wire 27 may be started from the distal end side of the core material 23 or may be started from the rear end side of the core material 23. In this example, as indicated by an arrow A, the lead wire 27 is wound from the distal end side toward the rear end side of the core material 23. Consequently, the first coil section 24A having a predetermined length is formed on the core material 23. At this point, it is desirable to wind the lead wire 27 densely such that at least windings of the lead wire 27 adjacent to one another are in contact with one another.

Figure 4B:
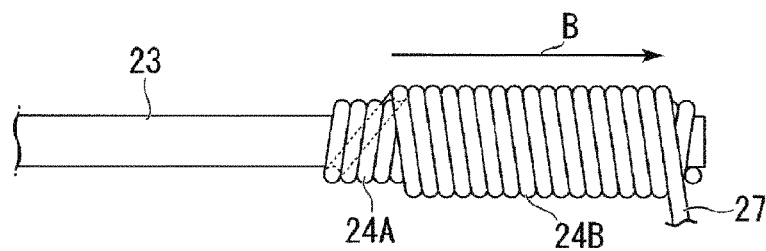

Subsequently, as shown in FIG. 4B, the lead wire 27 is folded back. The lead wire 27 is wound from the rear end side toward the distal end side of the core material 23 as indicated by an arrow B. In this example, rather than winding the lead wire 27 to overlap the first coil section 24A immediately after being folded back, the lead wire 27 in the second layer is wound from halfway in the first coil section 24A such that a part where the first coil section 24A is exposed is formed on the rear end side of the core material 23. Consequently, a second coil section 24B having a predetermined length is formed on the first coil section 24A. In this embodiment, "the coil section is exposed" means that the surface of at least a part of the coil section on the lower layer side, on which the lead wire 27 is laid, is exposed in a direction orthogonal to the extending direction of the core material 23, that is, a portion not overlapping the coil section on the upper layer side remains in the coil section on the lower layer side.

Figure 4C:
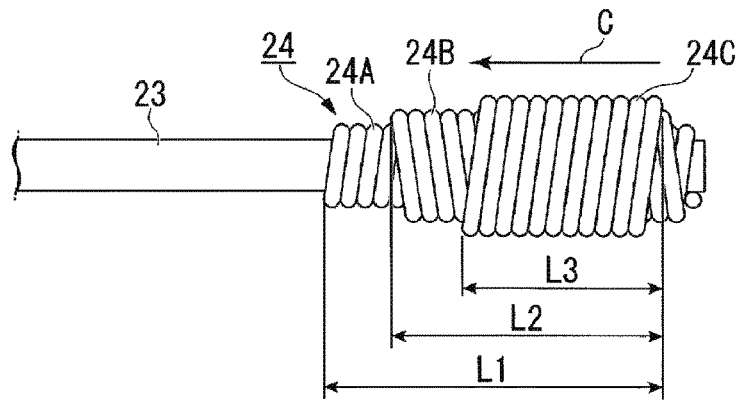

Subsequently, as shown in FIG. 4C, the lead wire 27 is folded back again and wound from the distal end side toward the rear end side of the core material 23 as indicated by an arrow C. The winding of the lead wire 27 in the third layer is stopped halfway in the second coil section 24B such that a part where the second coil section 24B is exposed is formed on the rear end side of the core material 23. The wound lead wire 27 is cut in any position. Consequently, the third coil section 24C having a predetermined length is formed on the second coil section 24B. According to the steps explained above, the coil section 24 including a step section having level differences in two stages is formed in which a part on the rear end side of the first coil section 24A is exposed from the second coil section 24B and a part on the rear end side of the second coil section 24B is exposed from the third coil section 24C. In the step section, the diameter on the rear end side of the coil section 24 decreases stepwise from the side close to the coil section 24 toward the side far from the coil section 24.

According to the method of winding the lead wire 27 shown in FIGS. 4A to 4C, the length of the second coil section 24B in the extending direction of the core material 23 is smaller than the length of the first coil section 24A in the extending direction of the core material 23 and the length of the third coil section 24C in the extending direction of the core material 23 is smaller than the length of the second coil section 24B in the extending direction of the core material 23. In the following explanation, the length of the coil section in the extending direction of the core material 23 is simply referred to as length of the coil. That is, when the length of the first coil section 24A is represented as L1, the length of the second coil section 24B is represented as L2, and the length of the third coil section 24C is represented as L3, L1>L2>L3. That is, in the step section, the length L2 of the second coil section 24B is set shorter than the length L1 of the first coil section 24A and the length L3 of the third coil section 24C is set shorter than the length L2 of the second coil section 24B. When it is assumed that the lead wire 27 is wound at the same density in all of the first coil section 24A, the second coil section 24B, and the third coil section 24C, the number of windings of the second coil section 24B is equal to or smaller than the number of windings of the first coil section 24A and the number of windings of the third coil section 24C is smaller than the number of windings of the second coil section 24B.

Figure 4D:
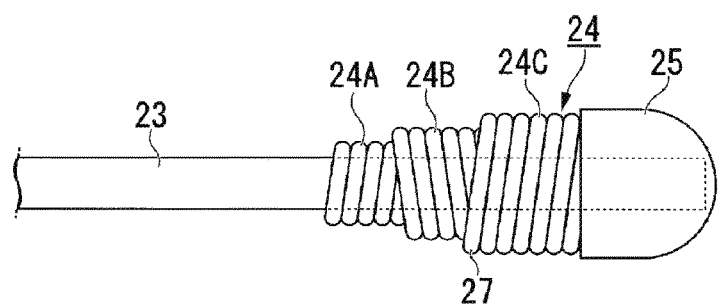

Subsequently, as shown in FIG. 4D, the distal end side of the coil section 24 is heated by means such as radiation of a laser beam and the windings of the lead wire 27 adjacent to one another are melted and integrated. Consequently, the distal end portion 25 is formed at the distal end of the core material 23. At this point, it is desirable to sufficiently heat the coil section 24 to integrate not only the windings of the lead wire 27 adjacent to one another in the extending direction of the core material 23 but also the windings of the lead wire adjacent to one another in the depth direction orthogonal to the extending direction of the core material 23, that is, the lead wire 27 of the first coil section 24A and the lead wire 27 of the second coil section 24B and the lead wire 27 of the second coil section 24B and the lead wire 27 of the third coil section 24C.

Figure 4E:
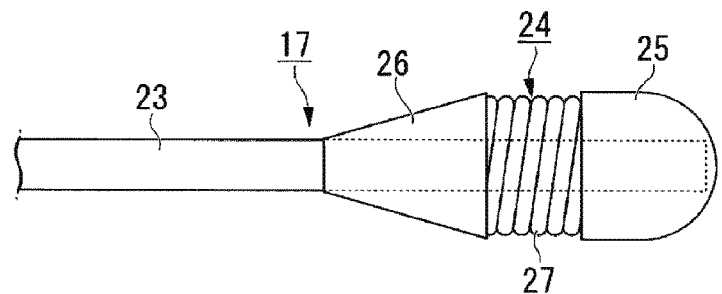

Subsequently, as shown in FIG. 4E, a portion on the rear end side of the coil section 24 is heated by means such as radiation of a laser beam and the windings of the lead wire 27 adjacent to one another are melted and integrated. The portion on the rear end side of the coil section 24 is a portion including a step section where the coil section 24 has level differences stepwise from the rear end of the first coil section 24A to the rear end of the third coil section 24C. At this point, the coil section 24 may be completely melted to integrate all the windings of the lead wire 27 adjacent to one another in the depth direction of the coil section 24 or the coil section 24 may be left without being completely melted in the depth direction of the coil section 24. The electrode 17 is completed according to the steps explained above.

When the coil section 24 is completely melted, as explained below, it is possible to effectively suppress unnecessary electric discharge between the luminous tube 16 and the electrode 17. When the coil section 24 is not completely melted, it is possible to improve stability of the shape of the rear end portion 26.

The discharge lamp 13 in this embodiment is completed according to the steps explained above.

A second example of the manufacturing process for the discharge lamp 13 having the configuration explained above is explained below.

FIGS. 5A to 5E are diagrams showing a second manufacturing process for the first electrode 17A.

A basic procedure of the second manufacturing process is the same as the first manufacturing process. Only a method of winding the lead wire 27 is different.

Figure 5A:
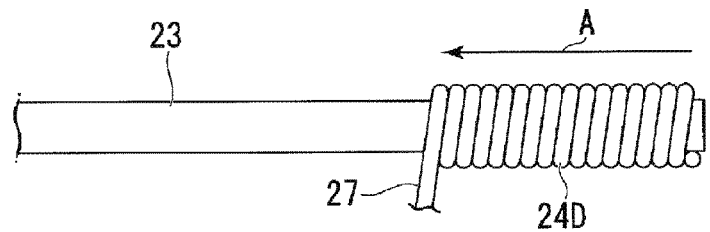
FIGS. 5A to 5E are diagrams showing another manufacturing process for the electrode.

First, as shown in FIG. 5A, the lead wire 27 made of tungsten is wound on the core material 23 made of tungsten. In FIGS. 5A to 5E, as in FIGS. 4A to 4E, the right side of the core material 23 is set as the distal end side and the left side of the core material 23 is set as the rear end side. The winding of the lead wire 27 may be started from the distal end side of the core material 23 or may be started from the rear end side of the core material 23. In this example, as indicated by an arrow A, the lead wire 27 is wound from the distal end side toward the rear end side of the core material 23. Consequently, a part 24D of the first coil section is formed on the core material 23. In this example, the length of the coil section 24D formed by winding the lead wire 27 for the first time is set smaller than length L1 of the first coil section formed finally. At this point, it is desirable to wind the lead wire 27 densely such that at least windings of the lead wire 27 adjacent to one another are in contact with one another.

Figure 5B:
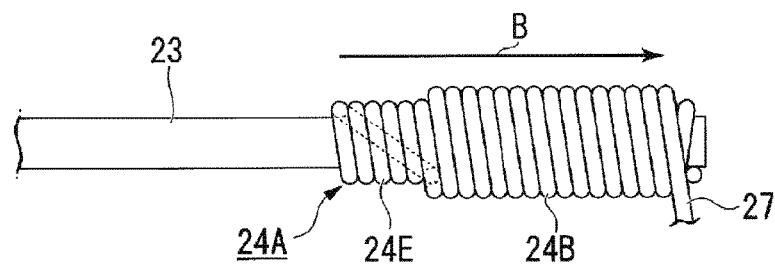

Subsequently, as shown in FIG. 5B, the lead wire 27 is folded back. The lead wire 27 is wound from the rear end side toward the distal end side of the core material 23 as indicated by an arrow B. In this example, the lead wire 27 is brought to a position separated to the rear end side of the core material 23 from the rearmost end of the coil section 24D on which the lead wire 27 is wound for the first time. The lead wire 27 is wound from the position toward the distal end side of the core material 23. In this case, the lead wire 27 is wound on the core material 23 from a folding back position to before the lead wire 27 overlaps the coil section 24D on which the lead wire 27 is wound for the first time. Therefore, the lead wire 27 forms a part 24E of the first coil section 24A formed finally. That is, the first coil section 24A having the length L1 is configured from the coil section 24D formed by winding the lead wire 27 on the core material 23 first and the part 24E formed by winding the lead wire 27 on the core material 23 next. Thereafter, the lead wire 27 is wound over the coil section 24D wound for the first time. The lead wire 27 wound on the coil section 24D forms the second coil section 24B. In this way, the second coil section 24B having the length L2 is formed on the first coil section 24A.

Figure 5C:
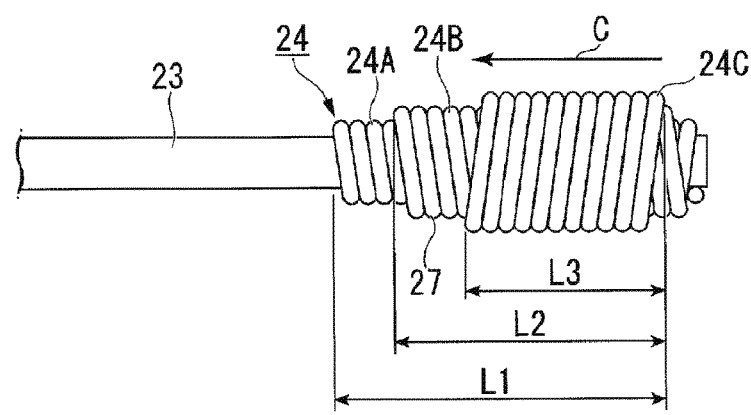
Figure 5D:
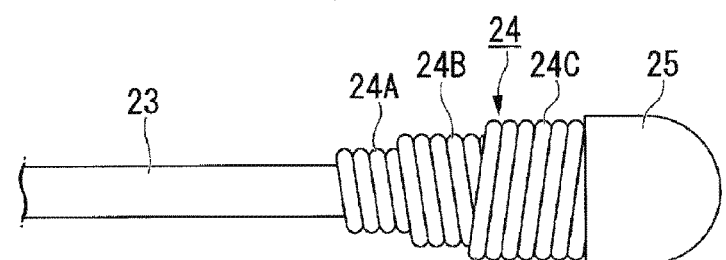
Figure 5E:
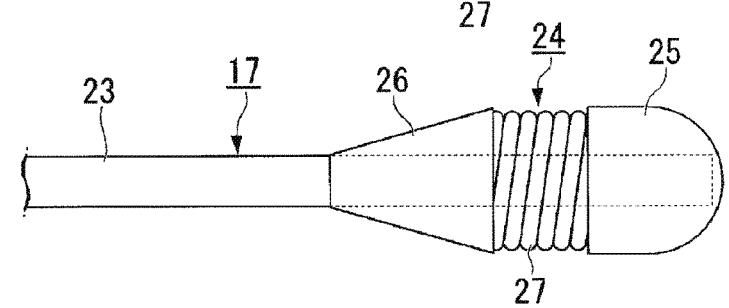

Subsequently, as shown in FIG. 5C, the lead wire 27 is folded back again and wound from the distal end side toward the rear end side of the core material 23 as indicated by an arrow C. The winding of the lead wire 27 in the third layer is stopped halfway in the second coil section 24B such that a part where the second coil section 24B is exposed is formed on the rear end side of the core material 23. The wound lead wire 27 is cut in any position. Consequently, the third coil section 24C having the length L3 is formed on the second coil section 24B. According to the steps explained above, the coil section 24 including a step section having level differences in two stages is formed in which a part on the rear end side of the first coil section 24A is exposed from the second coil section 24B and a part on the rear end side of the second coil section 24B is exposed from the third coil section 24C. A size relation among the length L1 of the first coil section 24A, the length L2 of the second coil section 24B, and the length L3 of the third coil section 24C is L1>L2>L3 as explained in the first example shown in FIGS. 4A to 4E.

The examples of the two manufacturing processes are explained above in this embodiment. However, a method of winding the lead wire 27 is not limited to the two methods explained above. In the two examples, the one lead wire 27 is folded back twice and continuously wound to form the coil section 24 having the three-layer structure. Instead of this method, for example, the lead wire 27 may be cut every time the lead wire 27 is wound in one direction to form the coil section 24 including three lead wires.

The action of the pair of electrodes 17 in lighting the discharge lamp 13 is explained below.

Figures 6A, 6B:
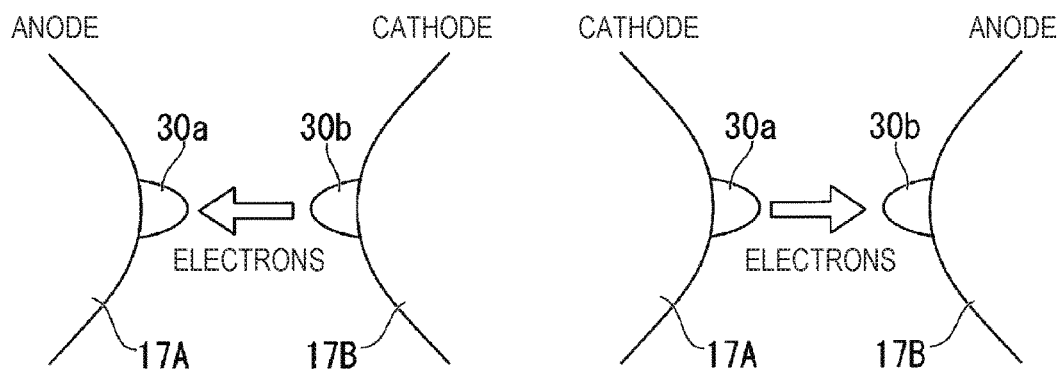
FIGS. 6A and 6B are diagrams for explaining the action of the electrode.

FIGS. 6A and 6B are diagrams showing the distal end portions 25 of the first electrode 17A and the second electrode 17B. Protrusions 30a and 30b are respectively formed at the distal ends of the distal end portions 25 of the first electrode 17A and the second electrode 17B. Electric discharge that occurs between the first electrode 17A and second electrode 17B mainly occurs between the protrusion 30a and the protrusion 30b. When the protrusions 30a and 30b are formed in this way, compared with when protrusions are not formed, it is possible to reduce fluctuation in discharge positions (arc positions) in the first electrode 17A and the second electrode 17B.

FIG. 6A shows a first polarity state in which the first electrode 17A operates as an anode and the second electrode 17B operates as a cathode. In the first polarity state, electrons move from the second electrode 17B (the cathode) to the first electrode 17A (the anode) according to electric discharge. The electrons are emitted from the cathode (the second electrode 17B). The electrons emitted from the cathode (the second electrode 17B) collide with the distal end of the anode (the first electrode 17A). Heat is generated by the collision and the temperature of the distal end (the protrusion 30a) of the anode (the first electrode 17A) rises.

FIG. 6B shows a second polarity state in which the first electrode 17A operates as a cathode and the second electrode 17B operates as an anode. In the second polarity state, contrary to the first polarity state, electrons move from the first electrode 17A to the second electrode 17B. As a result, the temperature of the distal end (the protrusion 30b) of the second electrode 17B rises.

In this way, when the driving current is supplied to the discharge lamp 13, the temperature of the anode, with which the electrons collide, rises. On the other hand, the temperature of the cathode, which emits the electrons, drops while the cathode is emitting the electrons to the anode. An inter-electrode distance between the first electrode 17A and the second electrode 17B increases according to deterioration of the protrusions 30a and 30b. This is because the protrusions 30a and 30b are worn. When the inter-electrode distance increases, light discharged by arc discharge between the electrodes diffuses to a wider range. A part of the light is not captured by the main reflection mirror 12 and the like and lost. A light amount of light finally projected from the projector 1 decreases. Consequently, tungsten, which is the material of the protrusions 30a and 30b, is desirably present in abundance at the distal end portions 25 of the first electrode 17A and the second electrode 17B such that the protrusions 30a and 30b can always maintain a satisfactory shape.

Figure 8:
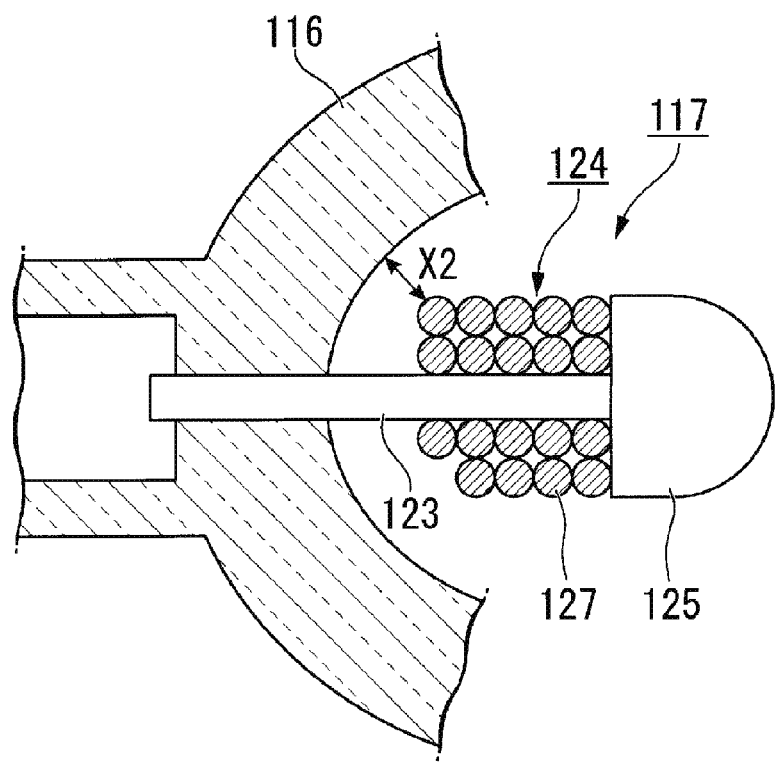
FIG. 8 is a partial sectional view of an electrode used in a discharge lamp in a comparative example.

FIG. 8 is a partial sectional view showing an electrode 117 in the past.

As shown in FIG. 8, the electrode 117 in the past is configured from a coil section 124 in which a lead wire 127 is wound on a core material 123 twice. In the case of this configuration, when the diameter of the lead wire 127 is increased to increase the capacity of the distal end portion 125, a distance X2 between the coil section 124 and the inner wall of a luminous tube 116 decreases. It is more likely that devitrification of the luminous tube 116 occurs because of electric discharge between the coil section 124 and the luminous tube 116.

On the other hand, the distal end portions 25 of the pair of electrodes 17 in this embodiment are formed on the basis of the lead wire 27 wound on the core material 23 three times. Therefore, when the electrode 17 having an outer diameter same as the outer diameter of the electrode 117 in the past is manufactured, the diameter of the lead wire 27 used in the electrode 17 in this embodiment is smaller than the diameter of the lead wire 127 used in the electrode 117 in the past. The length L2 of the second coil section 24B is smaller than the length L1 of the first coil section 24A. The length L3 of the third coil section 24C is smaller than the length L2 of the second coil section 24B. The rear end side of the coil section 24 includes the first diameter section 26A having the first diameter DA and the second diameter section 26B having the second diameter DB smaller than the first diameter DA and present in the position farther from the coil section 24 than the first diameter section 26A. Therefore, the weight of tungsten of the distal end portion 25 is easily increased by setting the density of the lead wire 27, which is the base of the distal end portion 25, higher than the density in the past and deviating the electrode capacity to the distal end portion 25 side where the protrusions 30a and 30b for arc discharge are formed. In this way, it is easy to manufacture the electrode 17 having a shape in which the center of gravity is deviated to the distal end side of the core material 23. Consequently, wear of the protrusion at the electrode distal end is suppressed. It is possible to suppress an increase in the inter-electrode distance.

Further, the rear end portion 26 is formed on the basis of the thin lead wire 27 wound in the three layers having level differences in two stages. Therefore, the inclining surface 26s formed by melting and integrating the lead wire 27 gently inclines with respect to the center axis of the electrode 17. As a result, a distance X1 between the rear end portion 26 of the electrode 17 and the luminous tube 16 is larger than the distance X2 in the past. The surface of the rear end portion 26 forms the inclining surface 26s and the level differences are reduced. Therefore, it is possible to sufficiently reduce the protrusion functioning as the start point of electric discharge. Because of these factors, it is possible to effectively suppress electric discharge between the electrode 17 and the luminous tube 16 and suppress occurrence of devitrification in the discharge lamp 13.

In this way, according to this embodiment, it is possible to provide the discharge lamp that can suppress both of an increase in the distance between the pair of electrodes and electric discharge between the electrode and the luminous tube and has long life.

In this embodiment, the ratio (D2/D1) of the diameter D2 of the lead wire 27 to the diameter D1 of the core material 23 is larger than 0.2 and smaller than 0.5. Consequently, wear of the protrusion is suppressed. It is possible to secure the luminance of the discharge lamp 13. This is because, when the ratio D2/D1 is equal to or smaller than 0.2, it is difficult to increase the weight of the distal end portion 25 of the electrode 17 and the protrusion wears early. This is also because, when the ratio D2/D1 is equal to or larger than 0.5, the outer diameter of the electrode 17 is too large, a part of light from arc discharge is blocked by the distal end portion of the electrode 17, and a light amount of light emitted from the discharge lamp 13 decreases.

In this embodiment, the relation among the length L1 of the first coil section 24A, the length L2 of the second coil section 24B, and the length L3 of the third coil section 24C is set as L1>L2>L3. However, the relation is not limited to this. The diameter of the lead wire 27 in this embodiment is smaller than the diameter of the lead wire of the electrode structure in the past. Therefore, the length L2 of the second coil section 24B may be equal to or smaller than the length L1 of the first coil section 24A. The length L3 of the third coil section 24C may be smaller than the length L2 of the second coil section 24B. In this configuration, as in the embodiment, it is possible to sufficiently increase the distance between the rear end portion of the electrode 17 and the inner wall of the luminous tube 16. It is possible to suppress occurrence of electric discharge between the electrode 17 and the luminous tube 16. That is, the relation of the lengths of the coil sections may be set as L1≥L2>L3.

Second Embodiment

A second embodiment of the invention is explained with reference to FIG. 7.

The basic configuration of a discharge lamp in this embodiment is the same as the basic configuration of the discharge lamp in the first embodiment. The configuration of a rear end portion is different from the configuration in the first embodiment.

Figure 7:
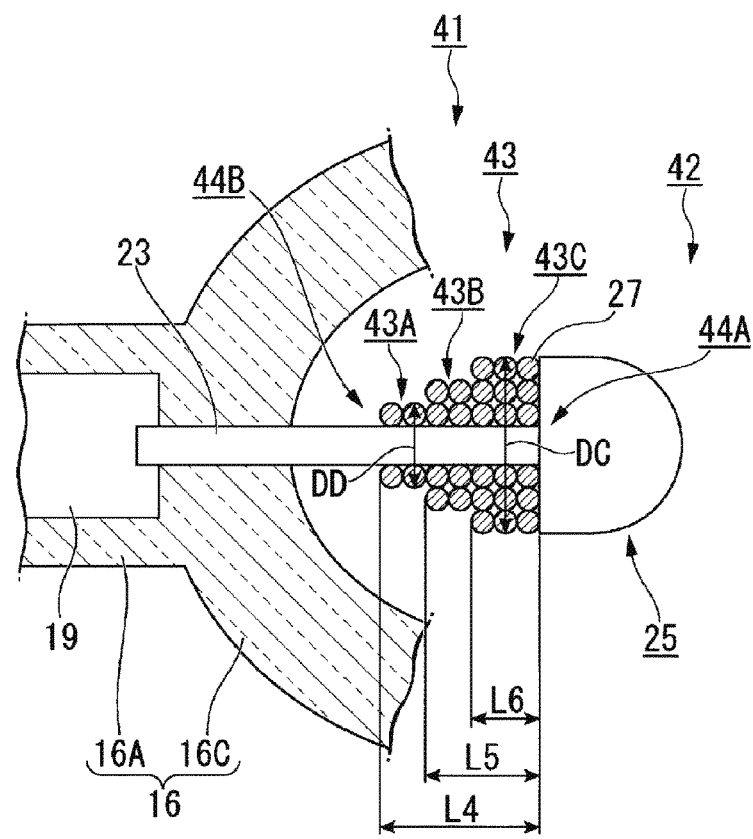
FIG. 7 is a partial sectional view of an electrode used in a discharge lamp in a second embodiment.

FIG. 7 is a partial sectional view of an electrode used in the discharge lamp in the second embodiment.

In FIG. 7, components common to FIG. 3 referred to in the first embodiment are denoted by the same reference numerals and signs and explanation of the components is omitted.

In the case of the discharge lamp 13 in the first embodiment, the rear end portion 26 of the electrode 17 is melted and integrated. On the other hand, in a discharge lamp 41 in the second embodiment, on the rear end side of an electrode 42, melting treatment is not applied to the lead wire 27 configuring a coil section 43. That is, the coil section 43 remains in a rear end portion 42b of the electrode 42. Therefore, the rear end portion 42b includes a step section having level differences in two stages, that is, a level difference between a first coil section 43A and a second coil section 43B and a level difference between the second coil section 43B and a third coil section 43C. Therefore, on the rear end side of the core material 23, all of the first coil section 43A, the second coil section 43B, and the third coil section 43C are exposed.

When the length of the first coil section 43A is represented as L4, the length of the second coil section 43B is represented as L5, and the length of the third coil section 43C is represented as L6, L4>L5>L6. A portion on the rear end side of the coil section 43 includes a first diameter section 44A having a first diameter DC and a second diameter section 44B having a second diameter DD smaller than the first diameter DC and present in a position farther from the distal end portion 25 than the first diameter section 44A. As in the first embodiment, the lengths of the coil sections can also be set as L4≥L5>L6.

The other components are the same as the components in the first embodiment.

In this embodiment, effects same as the effects of the first embodiment are obtained. That is, in this embodiment, the distal end portion 25 of the electrode 42 is formed on the basis of the lead wire 27 wound on the core material 23 three times. The diameter of the lead wire 27 used in the electrode 42 in this embodiment is smaller than the diameter of the lead wire 127 used in the electrode 117 in the past. The length L5 of the second coil section 43B is equal to or smaller than the length L4 of the first coil section 43A. The length L6 of the third coil section 43C is smaller than the length L5 of the second coil section 43B. The rear end side of the coil section 43 includes the first diameter section 44A having the first diameter DC and the second diameter section 44B having the second diameter DD smaller than the first diameter DC and present in the position farther from the coil section 43 than the first diameter section 44A. Therefore, by setting the density of the lead wire 27, which is the base of the distal end portion 25, higher than the density in the past and deviating the electrode capacity to the distal end portion 25 side where the protrusions 30a and 30b for arc discharge are formed, it is easy to manufacture the electrode 17 having a shape in which the center of gravity is deviated to the distal end side of the core material 23. Consequently, wear of the protrusion at the electrode distal end is suppressed. It is possible to suppress an increase in the inter-electrode distance.

Further, the rear end side of the coil section 43 includes the step section in which the diameter of the coil section 43 decreases stepwise from a side close to the coil section 43 toward a side far from the coil section 43. Consequently, it is possible to increase the distance between the rear end side of the electrode 42 and the inner wall of the luminous tube 16. It is possible to effectively suppress electric discharge between the electrode 42 and the luminous tube 16 and suppress occurrence of devitrification in the discharge lamp 41.

In the case of this embodiment, since melting treatment of the rear end side of the coil section 43 is unnecessary, it is possible to achieve simplification of a manufacturing process.

Note that the technical scope of the invention is not limited to the embodiments. Various changes can be added in a range not departing from the spirit of the invention.

In the embodiments, one of the pair of electrodes only has to include the coil section in which the metal wire is wound on the core material in three or more layers and include, on the rear end side of the coil section, the first diameter section having the first diameter and the second diameter section having the second diameter smaller than the first diameter and present in the position farther from the coil section than the first diameter section. Consequently, it is possible to suppress both of an increase in the distance between the pair of electrodes and electric discharge between the electrode and the luminous tube.

For example, in the embodiments, the example is explained in which the coil section is configured by the coil wound in three layers. However, the coil is not always limited to the coil wound in three layers and may be a coil wound in four layers. The rear end portion of the electrode only has to be reduced in diameter from the electrode distal end side toward the rear end side when the rear end portion is viewed as a whole. A part where the diameter slightly increases, a part where the diameter does not change, or the like may be present halfway. Besides, the shapes, the dimensions, the numbers, the dispositions, the materials, and the like of the components of the discharge lamp, the light source device, and the projector can be changed as appropriate.

In the embodiments, the example is explained in which the invention is applied to the transmission-type projector. However, the invention can also be applied to a reflection-type projector. The "transmission type" means that a liquid crystal light valve including a liquid crystal panel and the like is a type of transmitting light. The "reflection type" means that the liquid crystal light valve is a type of reflecting light. Note that the light modulating device is not limited to the liquid crystal panel and the like and may be, for example, a light modulating device including a micro mirror.

In the embodiments, the example of the projector 1 including the three liquid crystal panels (the liquid crystal light valves 6R, 6G, and 6B) is explained. However, the invention is also applicable to a projector including only one liquid crystal panel and a projector including four or more liquid crystal panels.

The entire disclosure of Japanese Patent Application No. 2015-144715, filed Jul. 22, 2015 is expressly incorporated by reference herein.

What is claimed is:

1. A discharge lamp comprising:
    a luminous tube; and
    a pair of electrodes provided on an inside of the luminous tube, wherein
    at least one of the pair of electrodes includes
        a core material,
        a coil section in which a metal wire is wound on the core material in three or more layers,
        a distal end portion made of a conductor and provided, with respect to the coil section, at an end portion of the core material on a side where the other electrode is disposed, and
        a rear end portion made of a conductor and provided on an opposite side of the distal end portion with respect to the coil section, and
    the rear end portion includes a first diameter section having a first diameter and a second diameter section having a second diameter smaller than the first diameter and present in a position farther from the coil section than the first diameter section.

2. The discharge lamp according to claim 1, wherein a ratio of a diameter of the metal wire to a diameter of the core material is larger than 0.2 and smaller than 0.5.

3. The discharge lamp according to claim 1, wherein at least a part of the rear end portion has a configuration in which the metal wire is wound on the core material.

4. The discharge lamp according to claim 3, wherein at least the part of the rear end portion includes a step section in which a diameter of the rear end portion decreases stepwise from a side close to the coil section toward a side far from the coil section.

5. The discharge lamp according to claim 4, wherein
    the coil section includes a first coil section in which the metal wire is wound on the core material, a second coil section in which the metal wire is wound on the first coil section, and a third coil section in which the metal wire is wound on the second coil section, and
    the step section is configured by setting a length of the second coil section in an extending direction of the core material to be equal to or smaller than a length of the first coil section in the extending direction of the core material and setting a length of the third coil section in the extending direction of the core material to be smaller than the length of the second coil section.

6. The discharge lamp according to claim 1, wherein at least a part of a surface of the rear end portion is melted and integrated.

7. The discharge lamp according to claim 6, wherein at least the part of the rear end portion includes an inclining section inclining in a direction in which a diameter of the rear end port ion decreases from a side close to the coil section toward a side far from the coil section.

8. A discharge lamp comprising:
    a luminous tube; and
    a pair of electrodes provided on an inside of the luminous tube, wherein
    at least one of the pair of electrodes includes
        a core material,
        a coil section in which a metal wire is wound on the core material in three or more layers, and
        a distal end portion made of a conductor and provided, with respect to the coil section, at an end portion of the core material on a side where the other electrode is disposed,
    the coil section includes a first coil section in which the metal wire is wound on the core material, a second coil section in which the metal wire is wound on the first coil section, and a third coil section in which the metal wire is wound on the second coil section,
    a length of the second coil section in an extending direction of the core material is equal to or smaller than a length of the first coil section in the extending direction of the core material,
    a length of the third coil section in the extending direction of the core material is smaller than the length of the second coil section in the extending direction of the core material, and
    an end portion of the coil section on an opposite side of the distal end portion includes a first diameter section having a first diameter and a second diameter section having a second diameter smaller than the first diameter and present in a position farther from the coil section than the first diameter section.

9. A manufacturing method for a discharge lamp including a luminous tube and a pair of electrodes provided on an inside of the luminous tube, the manufacturing method comprising:
    manufacturing the pair of electrodes; and
    encapsulating the pair of electrodes on the inside of the luminous tube, wherein
    the manufacturing the pair of electrodes includes:
        winding a metal wire on a core material in three or more layers to thereby form a coil section; and
        melting and integrating a distal end side of the core material wound with the metal wire,
    in the forming the coil section, the coil section includes a first coil section in which the metal wire is wound on the core material, a second coil section in which the metal wire is wound on the first coil section, and a third coil section in which the metal wire is wound on the second coil section,
    a length of the second coil section in an extending direction of the core material is equal to or smaller than a length of the first coil section in the extending direction of the core material and a length of the third coil section in the extending direction of the core material is smaller than the length of the second coil section in the extending direction of the core material, and
    the metal wire is wound on the core material such that the first coil section and the second coil section are exposed on a rear end side of the core material.

10. A projector comprising:
    the discharge lamp according to claim 1;

a light modulating device configured to modulate light emitted from the discharge lamp according to image information; and a projection optical system configured to project the light modulated by the light modulating device.

11. A projector comprising:

the discharge lamp according to claim 2;

a light modulating device configured to modulate light emitted from the discharge lamp according to image information; and a projection optical system configured to project the light modulated by the light modulating device.

12. A projector comprising:

the discharge lamp according to claim 3;

a light modulating device configured to modulate light emitted from the discharge lamp according to image information; and a projection optical system configured to project the light modulated by the light modulating device.

13. A projector comprising:

the discharge lamp according to claim 4;

a light modulating device configured to modulate light emitted from the discharge lamp according to image information; and a projection optical system configured to project the light modulated by the light modulating device.

14. A projector comprising:

the discharge lamp according to claim 5;

a light modulating device configured to modulate light emitted from the discharge lamp according to image information; and a projection optical system configured to project the light modulated by the light modulating device.

15. A projector comprising:

the discharge lamp according to claim 6;

a light modulating device configured to modulate light emitted from the discharge lamp according to image information; and a projection optical system configured to project the light modulated by the light modulating device.

16. A projector comprising:

the discharge lamp according to claim 7;

a light modulating device configured to modulate light emitted from the discharge lamp according to image information; and a projection optical system configured to project the light modulated by the light modulating device.

* * * * *